M. E. GROSSER.
ROOT PULLER.
APPLICATION FILED NOV. 27, 1911.
1,024,328.
Patented Apr. 23, 1912.
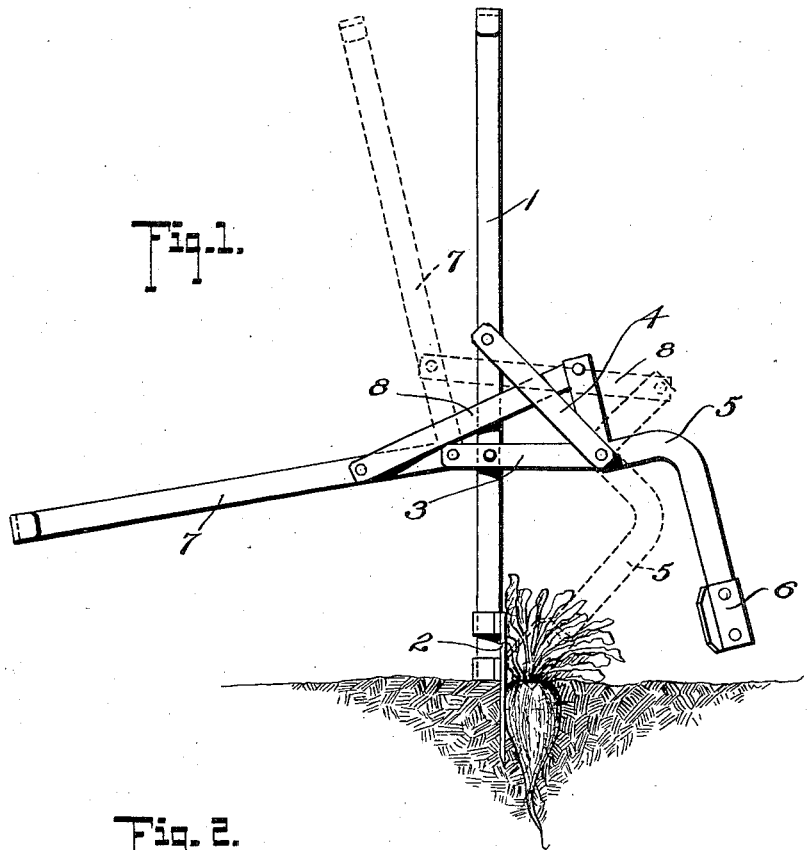
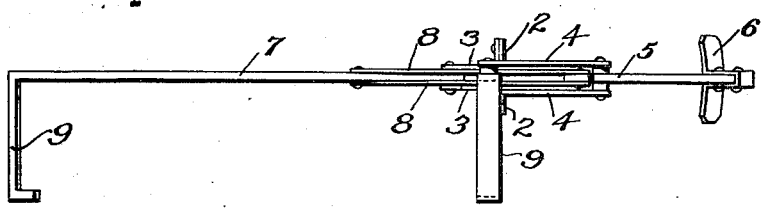
Witnesses
C. H. Wagner.
N. M. Brooks.
Inventor
Michael E. Grosser
By Robb
Attorneys
COLUMBIA PLANOGRAPH CO., WASHINGTON, D. C.

UNITED STATES PATENT OFFICE.

MICHAEL E. GROSSER, OF WATERVILLE, NEW YORK.

ROOT-PULLER.

1,024,328.

Specification of Letters Patent. Patented Apr. 23, 1912.

Application filed November 27, 1911. Serial No. 662,698.

*To all whom it may concern:*

Be it known that I, MICHAEL E. GROSSER, a citizen of the United States, residing at Waterville, in the county of Oneida and State of New York, have invented certain new and useful Improvements in Root-Pullers, of which the following is a specification.

This invention relates to farming implements, and has particular reference to that type of manually operated implements which is used for pulling or extracting beets, turnips, or the like from the ground. By use of the present invention, the vegetables may be collected more easily than by hand and also with less fatigue.

With the above and other objects in view, this invention consists of the construction, combination, and arrangement of parts, all as hereinafter more fully described, claimed and illustrated in the accompanying drawings, wherein:—

Figure 1 is a side elevation of the present invention illustrated in practical use; Fig. 2 is a top plan view of the invention as disclosed in Fig. 1; and Fig. 3 is a detail view of the vegetable gripping member.

Throughout the following detail description and on the several figures of the drawings, similar parts are referred to by like reference characters.

In the drawings, a spade member is provided comprising a handle 1 and the inserting member or blade 2 which may be detachably or otherwise carried on the lower terminal of the handle. Located on the handle 1 is a set of cross members or bars 3 forming an arm which extends in opposite directions from the handle 1 and is reinforced or braced by the diagonal members 4 which are preferably two in number and retained in spaced relation for the purpose hereinafter described. On the extremity of the arm 3 to which the brace means 4 is secured, the gripping member 5 is pivotally mounted, the latter comprising a bell crank portion, one arm of which is bent and extended downwardly on which extension is carried the root gripping plate 6. This vegetable gripping plate 6 may be detachably or otherwise carried by the member 5 and has its gripping face slightly curved to conform with the contour of the root.

On the other terminal of the arm 3 which extends from the opposite side of the handle 1 is pivotally mounted an operating lever 7 which has any suitable connection with the lever or member 5, such as a link 8. The handle 1 and the lever 7 may be provided with any suitable hand gripping means, such as is disclosed at 9 in Fig. 2.

The link members 8 are two in number, one passing on each side of the handle 1 and both passing between the spaced brace members 4 between which latter one arm of the lever 5 is adapted to work and be guided thereby. By having the gripping member 5 and the link members 8 guided between the brace members 4, and said link members 8 also guided by the member 1, a practical and desirable construction is obtained for the spade member and the gripping member 5 are retained in alinement, thus making the device efficient in operation.

The lever mechanism may be made separately and so disposed of on the market, whereby the same may be easily and quickly attached to an ordinary spade or shovel, the latter taking the place of the spade member above described.

Having thus fully described the invention, what is claimed as new is:—

1. In an implement of the class described, a spade member, an arm carried thereby, brace means for said arm, a gripping member movably carried by said arm and adapted to move against said spade member, and means for actuating said gripping member, said brace means acting as a guide for the last mentioned means and said gripping means.

2. In an implement of the class set forth, a spade member, an arm carried thereby, spaced brace members for said arm, a gripping member carried by said arm and adapted to move between and be guided by said brace members, an operating lever for said gripping member, and connections between said lever and gripping member.

3. In an implement of the class set forth, a spade member, an arm projecting in opposite directions from said member, spaced brace members for said arm, a gripping member carried by said arm and adapted to move between and be guided by said brace members, an operating lever carried by said arm on the opposite side of said spade member, and spaced connecting members between said lever and gripping member, said connecting members passing on each side of said spade member and between said brace members.

In testimony whereof I affix my signature in presence of two witnesses.

MICHAEL E. GROSSER.

Witnesses:
PAUL LAFAYETTE,
GEORGE GROSSER.

Copies of this patent may be obtained for five cents each, by addressing the "Commissioner of Patents, Washington, D. C."